US011288908B2

(12) United States Patent
Loganathan et al.

(10) Patent No.: US 11,288,908 B2
(45) Date of Patent: Mar. 29, 2022

(54) GEOLOCATION BASED SECURITY IN INTRUSION SYSTEMS

(71) Applicant: Carrier Corporation, Palm Beach Gardens, FL (US)

(72) Inventors: Karthikeyan Loganathan, Telangana (IN); Akil Vivek Jalisatgi, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 29 days.

(21) Appl. No.: 16/856,568

(22) Filed: Apr. 23, 2020

(65) Prior Publication Data

US 2020/0342702 A1  Oct. 29, 2020

(30) Foreign Application Priority Data

Apr. 26, 2019  (IN) .............................. 201911016773

(51) Int. Cl.
*G07C 9/37* (2020.01)
*G07C 9/38* (2020.01)
(Continued)

(52) U.S. Cl.
CPC ............. *G07C 9/37* (2020.01); *G06Q 50/265* (2013.01); *G07C 9/00309* (2013.01);
(Continued)

(58) Field of Classification Search
CPC ...................................................... G07C 9/37
See application file for complete search history.

(56) References Cited

U.S. PATENT DOCUMENTS 5,943,425 A * 8/1999 Mizikovsky .......... H04W 12/06
380/247
6,072,402 A * 6/2000 Kniffin ................. H04M 11/022
340/5.28
(Continued)

FOREIGN PATENT DOCUMENTS

CN  104453632 A  3/2015
CN  104680625 A  6/2015
(Continued)

OTHER PUBLICATIONS

Burm, Caitlin, "Dementia and Elderly GPS Tracking Devices", Senior Living Blog, Jun. 6, 2017, 8 pages.
(Continued)

*Primary Examiner* — K. Wong
(74) *Attorney, Agent, or Firm* — Cantor Colburn LLP

(57) ABSTRACT

Aspects of the invention are directed towards method and system for providing secure access to a user inside the premises. One or more embodiments of the invention describe receiving a user defined pre-access condition for a predetermined time by an input interface coupled to an intrusion panel. The pre-access condition for a user are authenticated and an authentication result is notified to a cloud server. The authentication is confirmed based on the pre-access condition together with geo-location information of the user within a defined geo-fencing boundary thereby satisfying dual authentication and transmitting the authentication result to the cloud server. A preset emergency notification and location tracking information are triggered on breach of the pre-access condition and/or geo-location information to a predefined user.

18 Claims, 5 Drawing Sheets

(51) Int. Cl.
*G06Q 50/26* (2012.01)
*G07C 9/00* (2020.01)
*H04W 4/021* (2018.01)

(52) U.S. Cl.
CPC .......... *G07C 9/00571* (2013.01); *G07C 9/38* (2020.01); *H04W 4/021* (2013.01); *G07C 2009/00325* (2013.01); *G07C 2209/08* (2013.01)

(56) References Cited

U.S. PATENT DOCUMENTS

| | | | |
|---|---|---|---|
| 6,076,164 A * | 6/2000 | Tanaka | G06F 21/34 |
| | | | 713/155 |
| 8,350,694 B1 | 1/2013 | Trundle et al. | |
| 9,262,879 B2 | 2/2016 | Ahearn et al. | |
| 9,378,598 B2 * | 6/2016 | Dumas | G07C 9/00309 |
| 9,501,924 B2 | 11/2016 | Kennedy et al. | |
| 9,652,917 B2 | 5/2017 | Johnson et al. | |
| 9,674,658 B2 | 6/2017 | Partheesh et al. | |
| 9,865,154 B2 | 1/2018 | Dey et al. | |
| 9,940,642 B1 * | 4/2018 | Shahid | G06Q 50/16 |
| 9,953,511 B2 | 4/2018 | Eskildsen et al. | |
| 10,097,368 B2 | 10/2018 | Balraj et al. | |
| 10,181,232 B2 | 1/2019 | Cheng et al. | |
| 10,511,810 B2 * | 12/2019 | Siminoff | H04M 11/025 |
| 2014/0292481 A1 | 10/2014 | Dumas et al. | |
| 2015/0019873 A1 * | 1/2015 | Hagemann | B60R 25/2081 |
| | | | 713/186 |
| 2015/0365787 A1 | 12/2015 | Farrell | |
| 2016/0323548 A1 | 11/2016 | Khot et al. | |
| 2016/0343183 A1 | 11/2016 | Dumas et al. | |
| 2016/0353239 A1 | 12/2016 | Kjellsson et al. | |
| 2017/0289753 A1 | 10/2017 | Mahasenan et al. | |
| 2018/0293876 A1 | 10/2018 | Herman et al. | |

FOREIGN PATENT DOCUMENTS

| | | |
|---|---|---|
| CN | 104060896 B | 2/2016 |
| CN | 205028364 U | 2/2016 |
| CN | 106056712 A | 10/2016 |
| CN | 106829703 A | 6/2017 |
| CN | 104806085 B | 7/2017 |
| CN | 106934884 A | 7/2017 |
| CN | 107749097 A | 3/2018 |
| CN | 107765565 A | 3/2018 |
| CN | 108765646 A | 11/2018 |
| EP | 2885769 B1 | 10/2019 |
| KR | 101875725 B1 | 7/2018 |
| WO | 2016191768 A1 | 12/2016 |

OTHER PUBLICATIONS

Estes, Adam Clark, "The History and Future of Locks and Keys", 2015, URL: https://gizmodo.com/the-history-and-future-of-locks-and-keys-1735694812, 11 pages.

Miller, Chance, "Friday Labs Unveils New Minimalist & Easy-to-Install Smart Lock With HomeKit Support", 9to5Mac, May 2, 2017, 7 pages.

Mobile Fence, Inc., "Best Parental Control App—Mobile Fence", 2014-2018, Internet; URL: https://www.mobilefence.com/; 9 pages.

European Search Report for Application No. 20171141.3; dated Sep. 16, 2020; 12 Pages.

* cited by examiner

GEOLOCATION BASED SECURITY IN INTRUSION SYSTEMS

FOREIGN PRIORITY

This application claims priority to Indian Patent Application No. 201911016773, filed Apr. 26, 2019, and all the benefits accruing therefrom under 35 U.S.C. § 119, the contents of which in its entirety are herein incorporated by reference.

TECHNICAL FIELD OF INVENTION

The present invention relates generally to the field of security systems. More particularly, the invention relates to an apparatus and method of operating access control systems for providing a secure access inside premises such as buildings, houses etc.

BACKGROUND OF THE INVENTION

Intrusion systems are designed to protect people and property with security. From simple installations to extensive projects, Intrusion security solutions offer alarm systems which can be integrated seamlessly with video cameras, smoke alarms, home automation devices, and more.

Intrusion control panels which are the heart of the system easily integrate with access control, fire, home and building automation, IP video, and more. Sensors (wireless/wired) can also be connected to the intrusion system, respond and communicate to the control panel in case of a security breach. Sensors can be of different types Door window sensor (DWS), Motion Sensor, Fire/CO, Shock, Freeze).

Existing security systems among others provide for latchkey alarm for intrusion detection and warning. Presently, latchkey alarms operate in intrusion systems based on the access codes physically provided to the latchkey systems by the user. The user enters the access code and gains access inside premises, say home, office etc. In such access codes based intrusion systems, the access code may be misused or manhandled by an unauthorized user for intruding the premises and security of the premises may be compromised.

In the existing art, an intrusion system is able to accept predetermined conditions for events to happen and accordingly, information is collected and processing is done by a connected server. In other words, in the latch key systems the information is collected and processed to determine whether a specific event has occurred. Based on the event, further actions are initiated by the intrusion systems.

There also exists a method and systems in the art where a latchkey system can be configured to define a geofencing boundary around the electronic lock, transmit the geofencing boundary information to the remote application over the network, and receive data from the remote application over the network indicating a geofencing entry or exit event. The system transmits an unlock command to the controller if a user's location is within a predetermined distance of the electronic lock and accordingly, the electronic lock is open automatically.

However, there are problems associated with the existing access control systems where a user gains access by either providing the key or opening the lock automatically. These systems can be compromised if they are misused and mishandled by miscreants. End users also look for simple ways to interact with their security systems and ensure safety and security of their family and loved ones.

Therefore, there is a need to develop methods and systems to provide better security to premises so that threat compromising security by unauthorized users could be minimized and additionally the security of the authorized users is ensured.

SUMMARY OF THE INVENTION

Various embodiments of the invention describe method of receiving a user defined pre-access condition for a predetermined time by an input interface coupled to an intrusion panel. The pre-access condition is authenticated for a user and a notification including an authentication result is sent to the cloud server. The authentication is confirmed based on the pre-access condition together with geo-location information of the user within a defined geo-fencing boundary thereby satisfying dual authentication and transmitting the authentication result to the cloud server. A preset emergency notification is also triggered along with the location information if the pre-access condition and/or geo-location information is breached, which is notified to a predefined user.

In another embodiment of the invention the input interface receives input from a plurality of users and at least one master user defining the pre-access condition. The predefined user can also be a master user.

In yet another embodiment of the invention the user defined pre-access condition is a Latch-Key code or can be one or more of Biometrics Comparison, Facial Recognition, Fingerprint Recognition, Iris Recognition, Palm Vein Recognition, Voice Authentication, and Radio Frequency Identification (RFID) Authentication.

In another embodiment of the invention the location tracking module is integrated to fetch the location tracking information from a real time location tracking application on handheld device, fitness band or vehicle of the user.

In still another embodiment of the invention, a preset emergency notification is triggered and location tracking information to a predefined user on expiry of the predetermined time.

In another embodiment of the invention, the authentication module confirms whether the associated user is a valid user.

In another embodiment of the invention a system comprising an input interface which is coupled to an intrusion panel. The input interface is adapted to receive a user defined pre-access condition for a predetermined time. The system includes an authentication module responsive to authenticate the pre-access condition and further notifying an authentication result to a cloud server. The system also includes a location tracking module which is integrated to the authentication module. There is an output interface coupled to the intrusion panel for transmitting the authentication result and geo-location information. The system comprises a plurality of network interface facilitating communication within the system and between the intrusion panel and the cloud server. The authentication module is integrated to the location tracking module and the output interface for access control. The authentication module confirms authentication based on the pre-access condition together with geo-location information of the user within a defined geo-fencing boundary thereby satisfying dual authentication and transmitting the authentication result to the cloud server. Further, the output interface is configured to trigger a preset emergency notification and location tracking information on breach of the pre-access condition and/or geo-location information to a predefined user.

In another embodiment of the invention, the input interface receives input from a plurality of users and at least one master user defining the pre-access condition. The pre-defined user can be a master user.

In yet another embodiment of the invention, the user defined pre-access condition is a Latch-Key code or any one or combination of Biometrics Comparison, Facial Recognition, Fingerprint Recognition, Iris Recognition, Palm Vein Recognition, Voice Authentication, and Radio Frequency Identification (RFID) Authentication.

In still another embodiment of the invention, the location tracking module is integrated to fetch the location tracking information from a real time location tracking application on handheld device, fitness band or vehicle of the user.

In another embodiment of the invention, the output interface trigger a preset emergency notification and location tracking information to a predefined user on expiry of the predetermined time.

In yet another embodiment of the invention, the authentication module confirms whether the associated user is a valid user.

In various other embodiments of the invention a computer readable medium is disclosed comprising one or more processors and a memory coupled to the one or more processors. The memory stores instructions which are executed by the one or more processors to receive a user defined pre-access condition for a predetermined time by an input interface coupled to an intrusion panel. The processor authenticates the pre-access condition for a user and notifying an authentication result to a cloud server. The authentication is confirmed based on the pre-access condition together with geo-location information of the user within a defined geo-fencing boundary thereby satisfying dual authentication and transmitting the result of authentication to the cloud server. A preset emergency notification and location tracking information are triggered on breach of the pre-access condition and/or geo-location information to a predefined user.

In further embodiment of the invention, the input interface receives input from a plurality of users and at least one master user defining the pre-access condition.

In another embodiment of the invention, the user defined pre-access condition is a Latch-Key code.

In another embodiment of the invention, the user defined pre-access condition is any one or combination of Biometrics Comparison, Facial Recognition, Fingerprint Recognition, Iris Recognition, Palm Vein Recognition, Voice Authentication, and Radio Frequency Identification (RFID) Authentication.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
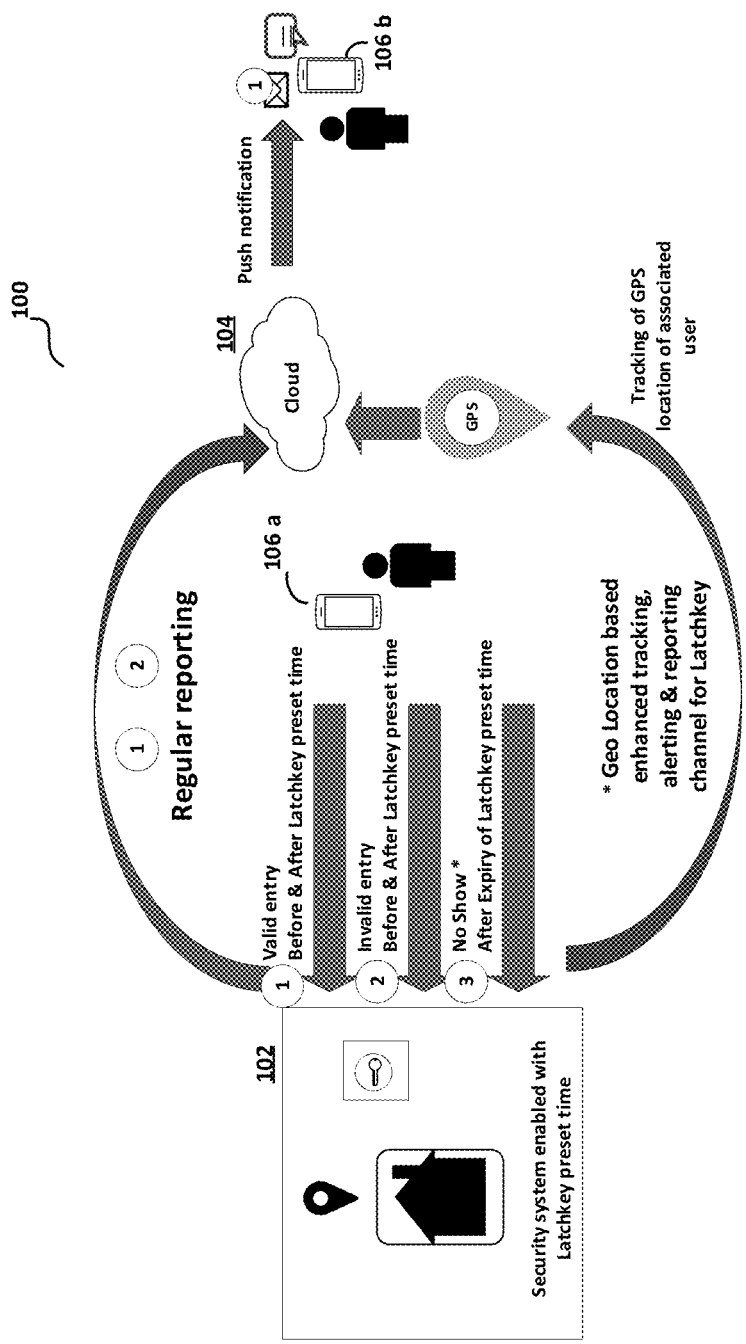
FIG. 1 depicts an exemplary block diagram illustrating different components of a system with flow of information according to an embodiment of the invention.

Various aspects of the invention are directed to the security systems operating to secure the premises as well as security of the members of a family. The security systems require to notify the users of the house in case of any breach in the security of the house. At the same time security system may be configured to provide safe access as well as assisting in security of the family members, for example.

The security system may be capable of secure access by different authentication methods and providing access by methods which are also convenient for the user as well.

Described herein is the technology with methods, apparatus, and devices for providing a secure access mechanism inside premises such as home, buildings, hospitals, offices etc. In different embodiments of the invention an intrusion system authenticates an associated user based on the access code as well as the location of the associated user. Further, the result of the authentication is provided to a master user.

In one embodiment of the invention, there may be several sensors associated with the intrusion system which reports various incidents such as breaking of the glass, burglary, movement of objects inside the house with no occupants available. Such sensors are enrolled to the intrusion system to provide specific information related to various incidents. These events can be reported to the master user via cloud. Further, the sensors may be configured to the intrusion system depending on the installation and needs. The sensor can be a Door/Window sensor (DWS)—Entry points/Doors/windows, a motion sensor-Interior/Exterior Perimeter of the premises or Fire/CO sensors—Within the house for fire prevention/smoke (CO) detection. Any breach reported by the sensors are communicated to the intrusion system which can be notified to the cloud and the master user. In case of breach an appropriate sensor gets triggered and communicates to the intrusion system through wired/wireless communication.

Various embodiments of the invention describe providing secure access to a user inside the premises (say office, home, building etc.). There are one or more users associated with an intrusion system comprising a latchkey. The one or more users may include at least one master user. The master user is authorized to control the permissions on the intrusion system and configure pre-access conditions for different users. The master user may be able to input different predetermined conditions or pre-access conditions which controls the functioning of the intrusion system. For example, the master user may be able to enter a latchkey timer for a specific user. Accordingly, the intrusion system will wait for the specific user to enter the premises on or before specific time entered in the latchkey timer. On arrival of the specific user, the intrusion system allows the specific user to input a unique access code provided to the specific user. The intrusion system will identify the location of the specific user before granting access inside the premises. If the intrusion system identifies an incorrect entry, the access is denied. The result of authenticating the specific user by access code and the location is communicated to a cloud which further communicates the result to the master user. The result to the master user is communicated using various communication means such as email, text messaging and the like.

The intrusion system during authentication captures the unique access code as well as the location of the specific user. If there is an error in the unique access code or the location of the specific user, the access to the premises is not granted. Accordingly, intrusion system may alert the master user with an invalid user along with the reason of denial of access to the specific user. In other words, the intrusion system may alert the user with denial of access with an information that location of the specific user was incorrect. That is, invalid user was accessing the premises.

In another scenario, a master user can configure the intrusion system with a latchkey expiry timer for let say, 3 PM for specific user, say a child. The intrusion system may wait for the expiry time of 3 PM. If the child enters on or before, the intrusion system will allow the child to input the unique access code (say punching RFID card). At the same time, the intrusion system determines whether the location of child is same as the location of the intrusion system via GPS. If both the conditions are found to be correct, the intrusion system will grant access to the child inside the premises. Further, the intrusion system will notify the master user (say, Mom) that child has arrived before the expiry of the latchkey timer.

In case, the child does not arrive at 3 PM (expiry time of the latchkey timer), the intrusion system will determine the location of the child and report the location of the child through an alert to the master user via cloud. The alert may inform that the child has not arrived by 3 PM and the latest location of the child is near 101 Lane (example). It is noted that the location of the child is the location of the device available with the child. In an embodiment of the invention, the child can wear the device or it can be part of the child's bag, for example. Alternatively, the device can be mobile phone. The device available with the child must have at least a GPS module to provide the location to the intrusion system. Any other devices providing location information back to the intrusion system is within the scope of the invention.

The intrusion system can be used to provide access to different users such as elderly, child, and other users for whom pre-access conditions can be configured in the system. Various types of users and pre-access conditions are within the scope of the invention.

Various embodiments of the present invention have advantages that with minimal changes in the existing intrusion systems, the security of the premises can be enhanced. In other words, by minimal changes in the existing intrusion systems, additional level of authentication is provided by checking the access code and the GPS location of the user. Further, there is increased tracking by notifying the master user about the user's GPS location in case the user does not arrive before a predetermined time.

Various embodiments of the invention describe a method of providing secure access to associated users inside premises via an intrusion system. The intrusion system receives an input from one or more users. The one or more users include associated users as well as at least one master user. The input is provided via an interface of the intrusion system by entering a latchkey timer for the associated user by a master user. Similarly, the input can be a unique access code input by the associated user. In one embodiment of the invention, the unique access code is different for plurality of the associated users as well as the master user.

At the same time, the intrusion system determines location of the associated user by using a location tracking module of the intrusion system. The associated user is authenticated and the access to the premises is granted or denied based on the unique access code entered by the associated user and location of the associated user obtained by the location tracking module. The result of authentication is notified to a cloud by the authentication module of the intrusion system. The cloud further provides result to the user via email, SMS, MMS, or any other push notifications known in the art.

On the other hand, if the associated user does not arrive on or before the expiry of the latchkey timer input by the master user, the intrusion system fetches the location of the associated user by the location tracking module and alerts the master user of the expiry of the latchkey timer along with the fetched location of the associated user. Accordingly, the master user will be well informed about the associated user. It is noted that the input of the latchkey can also be provided by users other than the master user and is within the scope of the invention. Other types of inputs other than described herein are within the scope of the invention.

In one embodiment of the invention, the user can input the access code by using keyboard. The user can also use a touch panel interface to key in the access code. In another embodiment of the invention, a Radio Frequency Identification (RFID) card may be user to punch the credentials in the intrusion system.

In an embodiment of the invention, the intrusion system uses the location tracking module to determine the location of the associated user. The location is generally determined by using the GPS and by interacting with the GPS module available on a device of the associated user. As discussed above, the device can be a user device such as a mobile phone, arm band, wristband, fitness band or any other device having at least a module capable of providing geo co-ordinates such as a GPS module.

In another embodiment of the invention, there exists a geofencing boundary around the intrusion system. The geofencing boundary for example, can be an imaginary boundary defined by the intrusion system for tracking the users. The geofencing boundary for a home can be around the building complex where the home is situated, for example. The intrusion system of the present invention is capable of monitoring a user when the user enters the geofencing boundary. As an example, if the associated user crosses the geofencing boundary, the intrusion system regularly receives location updates of the associated user. It is noted that location updates of the associated user can be same as the location of the device registered with the intrusion system for the associated user. In one embodiment of the invention, the intrusion system can track the location of the associated user by live streaming the movement of the associated user.

In one embodiment of the invention, when the associated user reaches before the intrusion system, the user is allowed to enter the user credentials in the form of unique access code or punching of the RFID badge or the like. The intrusion system may determine the location of the associated user.

The access codes can be for example, Biometrics Comparison, Facial Recognition, Fingerprint Recognition, Iris Recognition, Palm Vein Recognition, Voice Authentication, and Radio Frequency Identification (RFID) Authentication, and the like but not limited thereto.

Based on the access code and the location of the associated user, the intrusion system determines whether, the user entering the access code is same as the user pertaining to the location determined. In one embodiment of the invention, the intrusion system matches the unique access code with registered device whose location is determined. If the match is successful, the associated user is granted access to the premises and the associated user is a valid user. On the other hand if the access is not successful, access is denied and the master user is notified. The associated user in this case is termed as an invalid user the notification to the master user may also include the information related to denial of access. That is, the intrusion system may notify the master user with the information that access code is incorrect, location of the user is incorrect, or both are incorrect.

In another embodiment of the invention, a system such as an intrusion system or a latchkey system is disclosed. The system comprises an interface for receiving an input from one or more users. The input comprises a master user entering a latchkey timer for the associated user and entering a unique access code by an associated user. The system comprises a location tracking module for determining geo-location of the associated user. The apparatus has an authentication module to authenticate the associated user based on the access code and the geo-location of the associated user obtained by the location tracking module. The authentication module of the apparatus notify the result of authentication to a cloud. The authentication module confirms authentication based on the pre-access condition together with geo-location information of the user within a defined geo-fencing boundary thereby satisfying dual authentication and transmitting notification of authentication. An output interface of the system is coupled to the intrusion panel for transmitting the authentication result including geo-location of the user. The system also include a plurality of network interface facilitating communication within the system and between the intrusion panel and the cloud server. The output interface can trigger a preset emergency notification and location tracking information on breach of the pre-access condition and/or geo-location information to a predefined user or master user. In another scenario, if the user did not arrive at the premises before the expiry of the latchkey timer, the apparatus fetches the location of the associated user scheduled to arrive at the premises on or before the expiry of the latchkey timer. Thereafter, the apparatus alerts the master user by sending the alert along with the fetched location of the associated user to cloud. The cloud may be provisioned to instantly send the alert to the master user.

In one embodiment of the invention, the location tracking module of the intrusion system determines the location of the associated user by determining the location of a device carried by the associated user. It can be noted that the device can be a handheld device or any micro device capable of providing location information to the intrusion system preferably via GPS. Various methods of sharing location information between the device and the intrusion system are within the scope of the present invention.

In one embodiment of the invention, the authentication module authenticates the user based on the unique access code provided by the associated user and the location information fetched by the location tracking module. On successful authentication, permission to enter the premises is granted. In case, any of the information such as the unique access code as well as the location information is found to be incorrect, the access to the associated user inside the premises is denied.

FIG. 1 depicts a system 100 for providing secure access to a home or premises. The system includes a security system enabled with a latchkey. A unique access code is input by a user with a device 106a into the security system. The system also includes a cloud 104. The security system 102 is in communication with a cloud. The cloud is further connected to a master user with another device 106b. When a user enters the premises, the security system allows the user to enter the unique access code. The security system at the same time fetches the location of the user associated with the unique access code. If the security system determines that the unique code and the location of the user are matched, the security system allows the associated user to enter the premises and a notification is sent to the cloud 104. The cloud further pushes notification via email text etc. to the mater user regarding the entry of the associated user in the premises. Similarly, if the unique access code and the location of the user did not match, the access to the associated user is not granted and the security system send a notification to the cloud, which further initiates a notification to the master user.

The devices of the associated user and the master user (106a, 106b) can be hand held devices such as a user terminal or a smartphone with at least a location enabling chip or module such as GPS and network connectivity. Example of such devices can be a laptop, a smart phone, a tablet, and the like. As an example, the devices may be Apple® smartphone, an Android® smartphone, a Windows® smartphone and/or the like. In another embodiment of the invention, the devices are capable of providing location updates to the security system when required or automatically. In general, an operating system available on the devices provides an interface to communicate with the security system. In an example, the operating system installed on the devices can be a Windows® based operating system, a Mac® based operating system, and a Linux® based operating system or any other operating system known in the art.

There can be an interface on the security system to communicate with the cloud. For communicating with the cloud, the communication can be a wired or wireless communication. The wired communication can be enabled by Local Area Network (LAN), Ethernet, RS-232, RS-485, Universal Asynchronous Receiver Transmitter (UART) and other types of communications known in the art. Similarly, the security system can be connected via a wireless communication and transfers the data from the security system to cloud. The wireless communication can be enabled by Wi-Fi, Internet, Internet of Thing (IoT) based sensors and the like.

Figure 2:
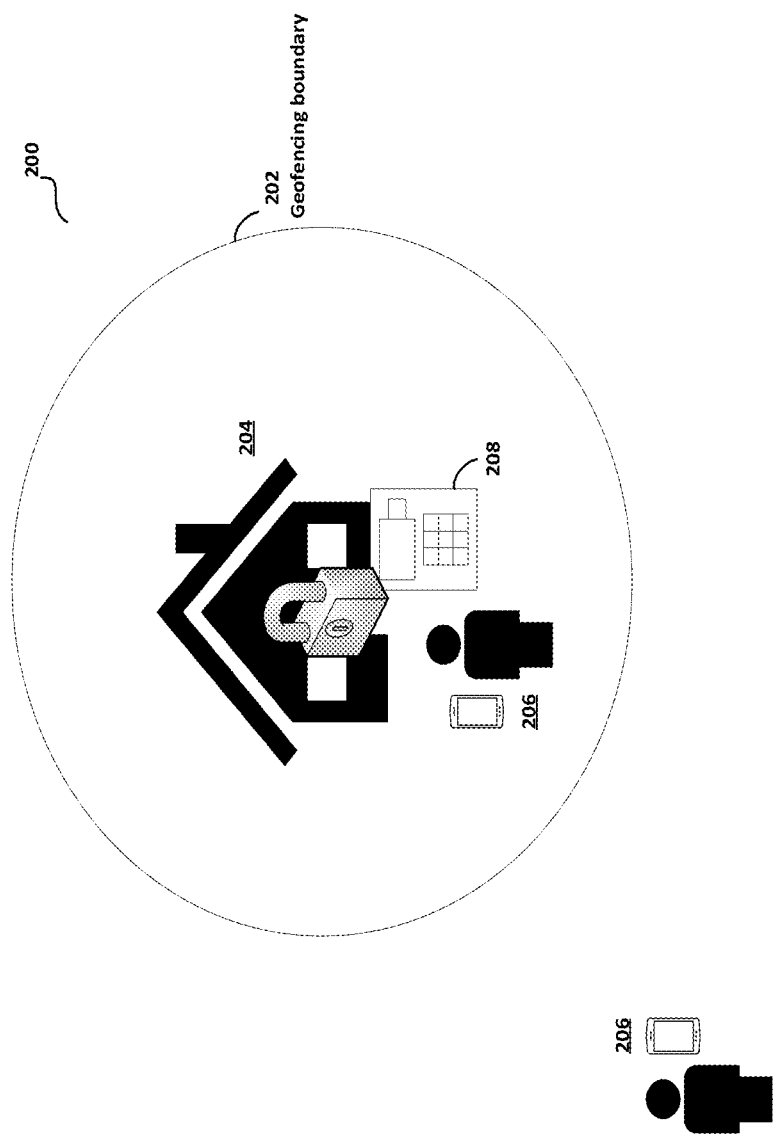
FIG. 2 depicts an exemplary diagram with a geofencing boundary for the security system according to an embodiment of the invention

In another embodiment of the invention, the security system may define a geofencing area around the security system. FIG. 2 illustrates an exemplary embodiment related to the geofencing aspect of the invention. When the associated user crosses the geofencing boundary 202 of the security system 204 to enter the premises, the security system 204 may start monitoring the associated user by fetching the location information from the device 206 of the associated user. When the associated user reaches the premises, the security system 204 allows the user to enter the unique access code of the associated user on a panel 208. The security system 204 determines if the unique access code matches with location information of the associated user. Accordingly, the access to the associated user inside the premises is granted or denied based on matching. Particularly, as discussed above, the location information of the associated user pertains to the location of the device 206 of the associated user which is being carried by the user. The security system 204 may be registered with the device 206. Thus, at the time of authentication of the associated user, the security system 204 may match the unique access code and the corresponding registered device 206 of the associated user.

Figure 3:
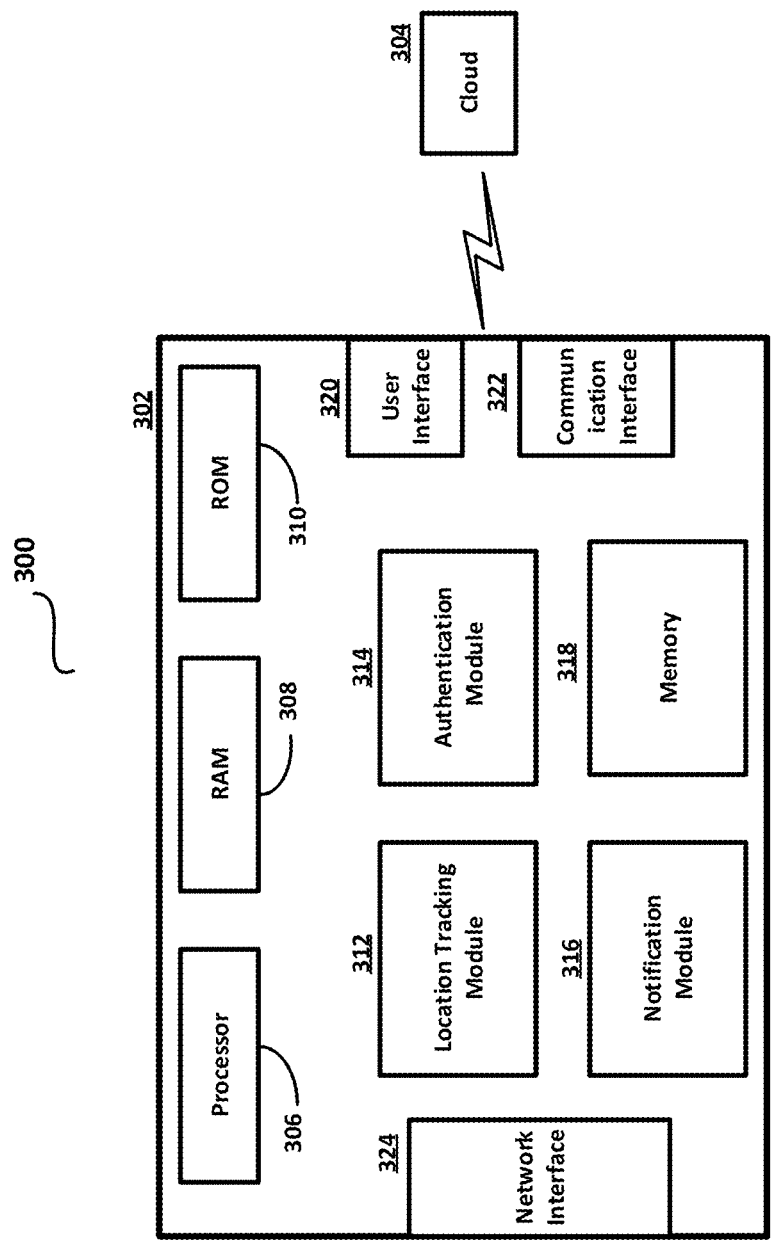
FIG. 3 is an exemplary block diagram of different components in a security system according to an embodiment of the invention.

FIG. 3 depicts the components of the security system or the intrusion system inside a system 300 for providing secure access to the users or occupants of the premises. The system 300 includes a security system 302 and a cloud 304. The security system 302 includes a processor 306, a memory comprising Random Access memory (RAM), 308 and a Read Only Memory (ROM), 310. A location tracking module 312 is used to track the location of a user by establishing a communication with a user device being carried by the user. Preferably, the location tracking module 312 uses GPS technology to determine the location of the user device. A user interface 320 is used to input a unique access code to access the premises. An authentication module 314 is configured to match the unique access code input by the user and the location information provided by the location tracking module 312. The authentication module 314 determines whether the user is a valid user depending upon the matching. On determining a valid user the authentication module notifies the cloud with information of the user entering the premises. On the other hand, if the authentication module 314 determines that the matching is not successful and the user in not a valid user, the information regarding the invalid user is sent to the cloud 304 via a communication interface 322 by a notification module 316 for transmission to other users such as a master user. A memory 318 can be used to store multiple latchkey timers for different user and other related information for a predetermined event.

Figure 4:
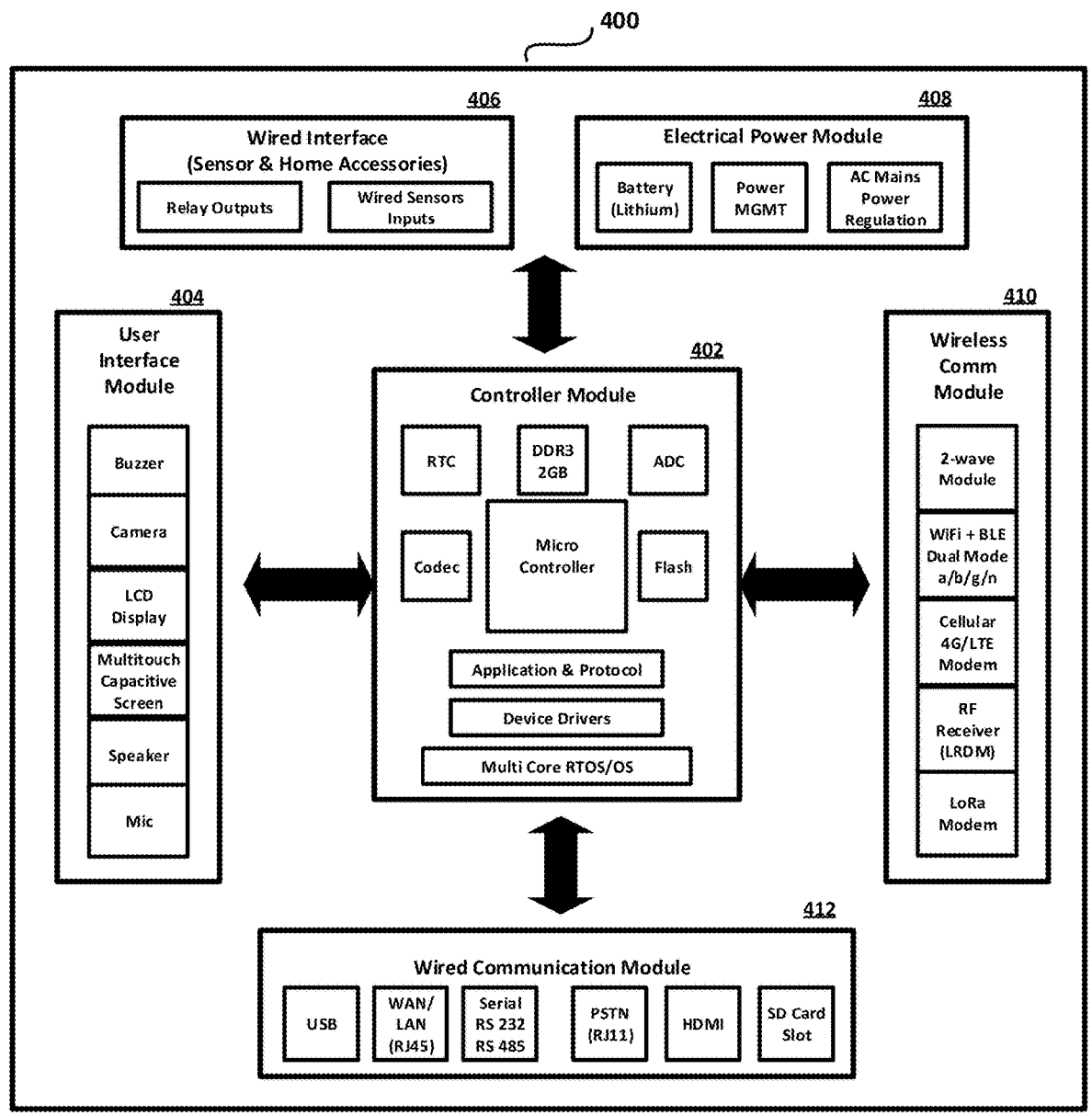
FIG. 4 is an exemplary block diagram of the security system with further details according to an embodiment of the invention.

FIG. 4 depicts various components in the intrusion system described in FIG. 3 in further detail. The intrusion system 400 includes a controller 402 module to enable functioning of the intrusion system. The system includes user interface module 404 for receiving input from the user in the form of access codes and the like. The user interface module comprises one or more of a buzzer, camera, Liquid Crystal Display (LCD), Multi-touch capacitive screen, Speaker, a microphone (MIC). The system further includes a wired interface 406 for the sensors and accessories installed within the premises. A electrical power module 408 comprising AC mains power for the operation of the system, a power management module for managing power for different modules of the system. In case the AC mains power is not available, the system can operate with the power from the battery. The system also include a wireless communication module 410 and a wired communication module 412. The wireless communication module comprises one or more of Z-wave module, Wi-Fi-Bluetooth Module, a modem for 4G/LTE communication, a radio frequency receiver and the like. The wired communication include serial as well as other interfaces. The serial interfaces can be a Universal Serial Bus (USB), RS232, RS485 and the like. Further, Local Area Network (LAN), PSTN and SD card slot can be available to achieve various functions known in the art.

Figure 5:
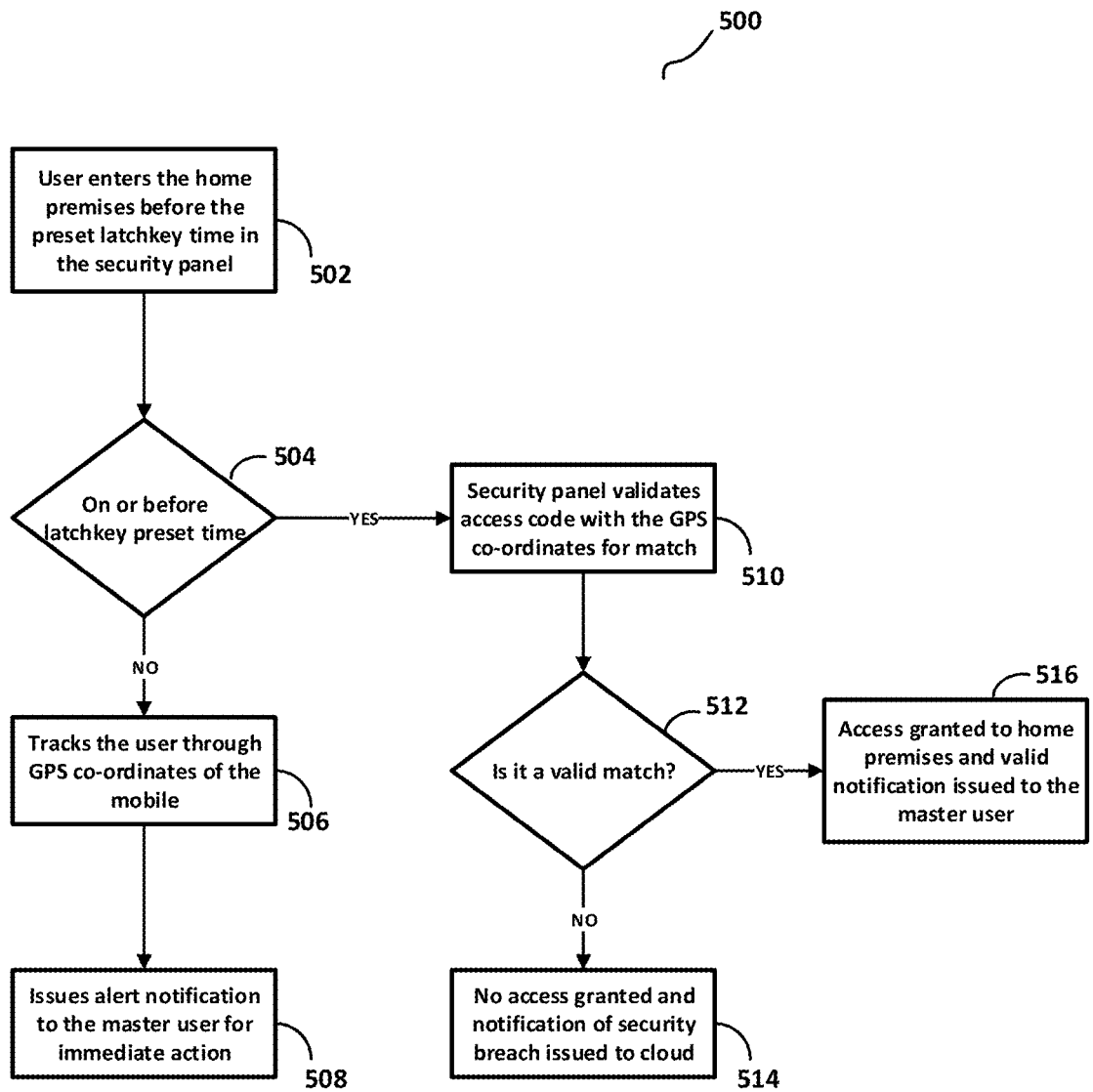
FIG. 5 is an exemplary flowchart illustrating a method to perform the invention according to an embodiment of the invention.

FIG. 5 depicts a flowchart outlining the features of the invention in an embodiment of the invention. The flowchart 500 describes a method being performed for enabling the invention. The method starts at 502 where a user enters the premises. A preset latch key time is already set in the security system for one or more users using the security system. The security system checks if the user arrives on or before the latchkey preset time 504. If the user arrives on or before the preset latchkey time, the security system allows the user to input the unique access code and the security system also determines the location co-ordinates of the user 510. The security system determines if the unique access code and the location information of the user presents a valid match 512. If the valid match is found, the access is granted to the user inside the premises and notification is issued regarding the valid entry of the user 516. If the security system determines that match is not valid, the access to the premises is not granted and the notification regarding the invalid user is sent to the cloud 514.

Moreover, if the user does not arrive before the latchkey preset time, an event is triggered by the security system and the security system is automatically enabled to track the intended user due to arrive at the latchkey preset time. The security system automatically searches for the location of the user by locating co-ordinates of a device associated with the intended user 506. In an embodiment of the invention, the device associated with the intended user is already registered with the security system. After tracking the co-ordinates of the user, the security system issues a notification to the cloud with the information that latchkey timer has expired for the user and the user is last located at the co-ordinates tracked by the security system 508. The co-ordinates can be transformed into local area designation such as lanes, known buildings, park, hospitals, schools, physical addresses or the like.

The control panel of the security system can be integrated to a cloud server acting as a central monitoring station for further analysis and defining different applications.

In an embodiment of the invention, a computer readable medium configured for the intrusion system is disclosed. The computer readable medium comprises at least one processor and at least one memory for storing the instructions which are executed by the at least one processor. On executing the instructions, the computer readable medium, receives an input from one or more users. The one or more users can be at least a master user and associated users. The input comprises entering a latchkey timer for the associated user by a master user and entering a unique access code by an associated user. A location of the associated user is determined and authentication is performed for validating the associated user. The authentication is performed based on the unique access code entered by the associated user and the location of the associated user. The result of authentication is notified to the cloud. If the associated user did not arrive before the expiry of the latchkey timer, location of the associated user is tracked. Once the location is obtained an alert is sent to the cloud information that associated user has not arrived and the latchkey timer has expired. The location is also communicated along with the alert. The alert is further communicated to the master user of the along with the fetched location of the associated user.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

Further reference to any content has been made throughout the specification and words and phrases such as "security system", "intrusion system", "latchkey system", or the like have been interchangeably used and means the system which validates and user and provide overall security of the premises. Further, the security system can also be implemented in the form of executable computer program, executable files in computer format and other types of formats known in the art. Moreover, the words and phrases like "user", "associated user", "specific user", "or the like have been interchangeably used which means the user for which latchkey timer has been preset.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
upon receiving a user defined pre-access condition within a predetermined time by an input interface coupled to an intrusion panel;
authenticating the pre-access condition for a user and notifying an authentication result to a cloud server, wherein the authentication is confirmed based on the pre-access condition together with geo-location information of the user within a defined geo-fencing boundary thereby satisfying dual authentication and transmitting the authentication result to the cloud server; and
triggering a preset emergency notification and location tracking information on breach of the pre-access condition and/or geo-location information to a predefined user;
upon expiry of the predetermined time without receiving the user defined pre-access condition:
triggering a preset emergency notification; and
providing location tracking information of the user to the predefined user.

2. The method as claimed in claim 1 wherein the input interface receives input from a plurality of users and at least one master user defining the pre-access condition.

3. The method as claimed in claim 2 wherein the predefined user is the master user.

4. The method as claimed in claim 1 wherein the user defined pre-access condition is a Latch-Key code.

5. The method as claimed in claim 1 wherein the user defined pre-access condition is any one or combination of Biometrics Comparison, Facial Recognition, Fingerprint Recognition, Iris Recognition, Palm Vein Recognition, Voice Authentication, and Radio Frequency Identification (RFID) Authentication.

6. The method as claimed in claim 1 wherein the location tracking module is integrated to fetch the location tracking information from a real time location tracking application on handheld device, fitness band or vehicle of the user.

7. The method as claimed in claim 1 wherein the authentication module confirms whether the user is a valid user.

8. A system comprising:
an input interface coupled to an intrusion panel, the input interface adapted to receive a user defined pre-access condition;
an authentication module responsive to authenticate the pre-access condition and notifying an authentication result to a cloud server;

a location tracking module integrated to the authentication module;

an output interface coupled to the intrusion panel for transmitting the authentication result and geo-location information;

a plurality of network interface facilitating communication within the system and between the intrusion panel and the cloud server;

wherein the authentication module is integrated to the location tracking module and the output interface for access control, wherein, upon receipt of the user defined pre-access condition within a predetermined time, the authentication module confirming authentication based on the pre-access condition together with geo-location information of the user within a defined geo-fencing boundary thereby satisfying dual authentication and transmitting the authentication result to the cloud server, and the output interface triggering a preset emergency notification and location tracking information on breach of the pre-access condition and/or geo-location information to a predefined user; and wherein, upon expiry of the predetermined time without receiving the user defined pre-access condition, the output interface is configured to trigger a preset emergency notification and provide location tracking information of the user to a predefined user.

9. The system as claimed in claim 8 wherein the input interface receives input from a plurality of users and at least one master user defining the pre-access condition.

10. The system as claimed in claim 9 wherein the pre-defined user is the master user.

11. The system as claimed in claim 8 wherein the user defined pre-access condition is a Latch-Key code.

12. The system as claimed in claim 8 wherein the user defined pre-access condition is any one or combination of Biometrics Comparison, Facial Recognition, Fingerprint Recognition, Iris Recognition, Palm Vein Recognition, Voice Authentication, Radio Frequency Identification (RFID) Authentication.

13. The system as claimed in claim 8 wherein the location tracking module is integrated to fetch the location tracking information from a real time location tracking application on handheld device, fitness band or vehicle of the user.

14. The system as claimed in claim 8 wherein the authentication module confirms whether the user is a valid user.

15. A computer readable medium comprising one or more processors and a memory coupled to the one or more processors, the memory storing instructions which are executed by the one or more processors, the one or more processors configured to:

upon receiving a user defined pre-access condition within a predetermined time by an input interface coupled to an intrusion panel;

authenticate the pre-access condition for a user and notifying an authentication result to a cloud server, wherein the authentication is confirmed based on the pre-access condition together with geo-location information of the user within a defined geo-fencing boundary thereby satisfying dual authentication and transmitting the result of authentication to the cloud server; and trigger a preset emergency notification and location tracking information on breach of the pre-access condition and/or geo-location information to a predefined user;

upon expiry of the predetermined time without receiving the user defined pre-access condition:

trigger a preset emergency notification; and provide location tracking information of the user to the predefined user.

16. The computer readable medium as claimed in 15 wherein the input interface receives input from a plurality of users and at least one master user defining the pre-access condition.

17. The computer readable medium as claimed in 15 wherein the user defined pre-access condition is a Latch-Key code.

18. The computer readable medium as claimed in 15 the user defined pre-access condition is any one or combination of Biometrics Comparison, Facial Recognition, Fingerprint Recognition, Iris Recognition, Palm Vein Recognition, Voice Authentication, Radio Frequency Identification (RFID) Authentication.

* * * * *